(12) United States Patent
Eiletz et al.

(10) Patent No.: US 12,202,545 B2
(45) Date of Patent: Jan. 21, 2025

(54) GROUP OF MOTOR VEHICLES WITH A BATTERY DRIVE VEHICLE AND/OR A HYBRID DRIVE VEHICLE AND/OR A FUEL CELL DRIVE VEHICLE AND/OR AN INTERNAL COMBUSTION ENGINE DRIVE VEHICLE

(71) Applicant: Bayerische Motoren Werke Aktiengesellschaft, Munich (DE)

(72) Inventors: Richard Eiletz, Deisenhofen (DE); Robert Harrison, Sankt Wolfgang (DE); Robert Loch, Munich (DE); Alexander-Wilhelm Otte, Egenhofen (DE); Christoph Warkotsch, Munich (DE); Alexander Weingardt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 448 days.

(21) Appl. No.: 17/595,200

(22) PCT Filed: May 15, 2020

(86) PCT No.: PCT/EP2020/063610
§ 371 (c)(1),
(2) Date: Nov. 11, 2021

(87) PCT Pub. No.: WO2020/234152
PCT Pub. Date: Nov. 26, 2020

(65) Prior Publication Data
US 2022/0212721 A1    Jul. 7, 2022

(30) Foreign Application Priority Data
May 22, 2019    (DE) ............... 10 2019 113 700.4

(51) Int. Cl.
*B62D 25/02* (2006.01)
*B60K 1/04* (2019.01)
(Continued)

(52) U.S. Cl.
CPC ............. *B62D 25/025* (2013.01); *B60K 1/04* (2013.01); *B60L 50/66* (2019.02); *B60L 50/71* (2019.02);
(Continued)

(58) Field of Classification Search
CPC ................. B60K 2001/0438; B62D 25/025
See application file for complete search history.

(56) References Cited

U.S. PATENT DOCUMENTS

| 8,517,128 B2 * | 8/2013 | Gleyzes | B60K 5/04 |
| | | | 180/243 |
| 9,499,205 B1 * | 11/2016 | Elia | B60K 6/28 |

(Continued)

FOREIGN PATENT DOCUMENTS

| CN | 102470893 A | 5/2012 |
| CN | 102529666 A | 7/2012 |

(Continued)

OTHER PUBLICATIONS

International Search Report (PCT/ISA/210) issued in PCT Application No. PCT/EP2020/063610 dated Jul. 22, 2020 with English translation (five (5) pages).

(Continued)

*Primary Examiner* — Brian L Swenson
(74) *Attorney, Agent, or Firm* — Crowell & Moring LLP

(57) ABSTRACT

A group of motor vehicles contains at least vehicles of two different vehicle types of the following vehicle types: a battery drive vehicle with only one electric motor drive, a hybrid drive vehicle with an electric motor drive and an internal combustion engine drive, a fuel cell drive vehicle (Continued)

with a fuel cell drive, and an internal combustion engine drive vehicle with only one internal combustion engine drive. All of the vehicle types of the group of motor vehicles have a base assembly with a left-side sill structure, a right-side sill structure, an upper base, a lower base, and a central tunnel structure.

15 Claims, 2 Drawing Sheets

(51) Int. Cl.
  *B60L 50/60* (2019.01)
  *B60L 50/71* (2019.01)
  *B62D 21/15* (2006.01)
  *B62D 27/06* (2006.01)
(52) U.S. Cl.
  CPC .......... *B62D 21/157* (2013.01); *B62D 27/06* (2013.01); *B60K 2001/0438* (2013.01)

(56) References Cited

U.S. PATENT DOCUMENTS

| | | | |
|---|---|---|---|
| 10,780,794 B2* | 9/2020 | Zenner | H01M 10/66 |
| 11,377,089 B1* | 7/2022 | Smith | B60W 20/40 |
| 2010/0163322 A1 | 7/2010 | Stefani et al. | |
| 2011/0266838 A1* | 11/2011 | Leopold | B62D 25/2018 |
| | | | 296/193.07 |
| 2013/0008733 A1 | 1/2013 | Gleyzes et al. | |
| 2013/0206496 A1 | 8/2013 | Hashimoto | |
| 2014/0170342 A1 | 6/2014 | Peitz | |
| 2016/0006008 A1 | 1/2016 | Volz | |
| 2016/0200191 A1 | 7/2016 | Ito et al. | |
| 2017/0040836 A1* | 2/2017 | Ozaki | B60L 53/12 |
| 2017/0217498 A1 | 8/2017 | Akhlaque-e-rasul et al. | |
| 2018/0065674 A1* | 3/2018 | Maier | B62D 21/152 |
| 2018/0105209 A1 | 4/2018 | Fees et al. | |
| 2020/0369140 A1* | 11/2020 | McCarron | B60K 1/04 |
| 2023/0356582 A1* | 11/2023 | Ostertag | B60R 16/0238 |

FOREIGN PATENT DOCUMENTS

| | | |
|---|---|---|
| CN | 105144425 A | 12/2015 |
| CN | 206953970 U | 2/2018 |
| DE | 10 2010 011 578 A1 | 9/2011 |
| DE | 10 2012 112 540 A1 | 6/2014 |
| DE | 10 2013 204 765 A1 | 9/2014 |
| DE | 10 2016 100 392 A1 | 7/2016 |
| DE | 20 2016 104 985 U1 | 2/2017 |
| DE | 10 2017 101 448 A1 | 8/2017 |
| DE | 10 2016 223 749 A1 | 5/2018 |
| EP | 2 402 191 A1 | 1/2012 |
| JP | 2000-108948 A | 4/2000 |

OTHER PUBLICATIONS

German-language Written Opinion (PCT/ISA/237) issued in PCT Application No. PCT/EP2020/063610 dated Jul. 22, 2020 (six (6) pages).
German-language Search Report issued in German Application No. 10 2019 113 700.4 dated Apr. 15, 2020 with partial English translation (11 pages).
English translation of Chinese Office Action issued in Chinese Application No. 202080034217.8 dated May 27, 2023 (9 pages).

\* cited by examiner

GROUP OF MOTOR VEHICLES WITH A BATTERY DRIVE VEHICLE AND/OR A HYBRID DRIVE VEHICLE AND/OR A FUEL CELL DRIVE VEHICLE AND/OR AN INTERNAL COMBUSTION ENGINE DRIVE VEHICLE

BACKGROUND AND SUMMARY OF THE INVENTION

The present invention relates to a group of motor vehicles having at least two vehicle types selected from a battery drive vehicle, a hybrid drive vehicle, a fuel cell drive vehicle and an internal combustion engine drive vehicle.

Motor vehicles with different types of drives are known. These vehicles have an architecture which is conceived so as to correspond to the type of drive.

Known electric vehicles have a so-called traction battery which serves for storing electrical energy for an electric drive of the electric motor vehicle. A traction battery of this type is constructed from battery cells which in turn are combined so as to form battery modules. The battery cells, or battery modules, respectively, are accommodated in a housing which serves as a protection of the battery cells and contains devices which serve for climatizing and controlling the battery cells. For example, a battery assembly of this type conjointly with a housing is disposed in a floor pan region of a motor vehicle, so as to be between the front and the rear axle of the motor vehicle.

Furthermore, there are hybrid vehicles which have an electric drive with an electric motor and a traction battery as well as an internal combustion engine with a corresponding exhaust system.

Moreover known are fuel cell vehicles which, in a manner analogous to a vehicle driven purely by an electric battery, have an electric motor for the drive, a buffer battery for temporarily storing electrical energy, and a fuel cell for generating electrical energy. The fuel cell here is often operated with hydrogen which is stored under pressure in a pressure vessel.

It is the object of the present invention to provide a group of motor vehicles having at least two vehicle types, that is to say two different types of drives, selected from a battery drive vehicle, a hybrid drive vehicle, a fuel cell drive vehicle and an internal combustion engine drive vehicle, wherein the vehicles of the group of motor vehicles have a similar construction such that the manufacturing of these vehicles is simplified.

The group of motor vehicles according to the invention includes at least vehicles of two different vehicle types of the following vehicle types:
- a battery drive vehicle having only one electric motor drive;
- a hybrid drive vehicle having an electric motor drive and an internal combustion engine drive;
- a fuel cell drive vehicle having a fuel cell drive; and
- an internal combustion engine drive vehicle having only one internal combustion engine drive.

All vehicle types of the group of motor vehicles have a floor pan assembly having a left rocker rail structure and a right rocker rail structure, an upper floor pan and a lower floor pan and a central tunnel structure.

The floor pan assembly of all vehicle types of the group of motor vehicles has an energy storage installation space which is disposed between the left rocker rail structure and the central tunnel structure as well as the right rocker rail structure and the central tunnel structure.

In the battery drive vehicle, drive battery lines as well as vehicle operating equipment lines and/or vehicle electrical/electrical lines and/or interior ventilation outlet and interior ventilation inlet lines run in the central tunnel structure, and a drive battery assembly is disposed in the energy storage installation space.

In the hybrid drive vehicle, drive battery lines as well as vehicle operating equipment lines, in particular a fuel line, and/or vehicle electrical/electrical lines and/or interior ventilation outlet and interior ventilation inlet lines run in the central tunnel structure. A drive battery assembly is accommodated in the energy storage installation space.

In the fuel cell drive vehicle, drive battery lines as well as vehicle operating equipment lines and/or vehicle electrical/electrical lines and/or interior ventilation outlet and interior ventilation inlet lines run in the central tunnel structure. A drive battery assembly is accommodated in the energy storage installation space.

In the internal combustion engine drive vehicle, vehicle operating equipment lines, in particular a fuel line, and/or vehicle electrical/electrical lines and/or interior ventilation outlet and interior ventilation inlet lines run in the central tunnel structure.

The energy storage installation space can be embodied so as to be fluid-tight and at the top can be delimited by the upper floor pan and at the bottom be delimited by the lower floor pan.

The battery drive vehicle has in particular only the electric motor drive having a drive battery as the energy source and at least one electric motor for driving the vehicle. The battery drive vehicle can also be referred to as a BEV vehicle, wherein BEV stands for battery electric vehicle. The battery drive vehicle does not have any further drive apart from the electric motor drive.

The hybrid drive vehicle has in particular the electric motor drive having a battery as the energy source and an electric motor as well as the internal combustion engine drive having an internal combustion engine, a fuel tank and an exhaust system. The combination of a drive with an internal combustion engine and an electric motor is usually referred to as a hybrid drive. The battery of the hybrid drive vehicle is externally chargeable, for example. A hybrid drive vehicle of this type is also referred to as a PHEV, wherein PHEV stands for plug-in hybrid electric vehicle.

The fuel cell drive vehicle has in particular the fuel cell drive having the electric motor and a drive battery, which serves as a temporary storage for the electrical energy generated by a fuel cell, as well as the fuel cell and a fuel cell pressure vessel for an energy carrier, for example hydrogen, for operating the fuel cell. A fuel cell drive vehicle of this type is also referred to as an FCEV, wherein FCEV stands for fuel cell electric vehicle.

The internal combustion engine drive vehicle has in particular the internal combustion engine drive having only one internal combustion engine, a fuel tank and an exhaust system and no further drive. The internal combustion engine drive vehicle has neither an electric motor nor a drive battery (the internal combustion engine drive vehicle can of course have a starter battery).

With the exception of the internal combustion engine drive vehicle, all vehicle types of the group of motor vehicles have a drive battery assembly, wherein the drive battery assembly comprises at least battery cells and/or battery modules having a multiplicity of battery cells, a control unit as well as a temperature-control unit.

The vehicle types are part of a vehicle model range, for example, and for example also have an identical or similar chassis, an identical or similar front subframe, an identical or similar rear subframe, an identical or similar vehicle interior, an identical or similar external body shape, etc.

According to the invention, the vehicle types of the group of motor vehicles having different drive concepts have a fundamentally identical construction in terms of the floor pan assembly having rocker rails, a lower floor pan, an upper floor pan and a central tunnel structure. This enables an efficient development and construction of the vehicle types of the group of vehicles having different drive concepts. Installation space which is available in the floor pan assembly is to some extent utilized in a different manner in the different drive concepts. Despite the different drive concepts, the installation space is thus optimally used in each vehicle of the group of vehicles. The vehicles having the different drive concepts differ in terms of the body as little as possible such that a proportion of identical parts is as high as possible, the costs of the group of vehicles thus being reduced. Furthermore, despite the different drive concepts, the group of vehicles according to the invention can be efficiently built on one assembly line for all vehicles of the group of vehicles by virtue of the fundamentally identical construction.

In the hybrid drive vehicle an exhaust system is preferably disposed in the central tunnel structure.

In the internal combustion engine drive vehicle an exhaust system is furthermore preferably disposed in the central tunnel structure.

According to a preferred refinement of the group of motor vehicles, the central tunnel structures of the different vehicle types are different from one another in terms of their construction. The central tunnel structures have in particular different sizes, depending on the vehicle type. A different size refers in particular to a width and/or a height of the central tunnel structure.

The central tunnel structure of the battery drive vehicle here is smaller than the central tunnel structure of the hybrid drive vehicle, the exhaust system being additionally disposed in the central tunnel structure of the hybrid drive vehicle as opposed to the central tunnel structure of the battery drive vehicle. Furthermore, because of the energy storage installation space in which the fuel pressure vessel is accommodated, the central tunnel structure of the fuel cell drive vehicle is larger than that of the other vehicle types. Overall, the central tunnel structure of the vehicle types is advantageously adapted to the requirements of the vehicle types in terms of a size of the central tunnel structure.

The central tunnel structure advantageously has one chamber or a plurality of chambers which in the longitudinal direction of the floor pan assembly extends/extend in particular across an entire length of the floor pan assembly. The chambers can be disposed below one another and/or next to one another.

The chambers can be configured so as to be fluid-tight in relation to one another, that is to say that they can be separated from one another by fluid-tight bulkheads.

The chamber/chambers of the central tunnel structure can preferably be configured by a longitudinal chassis beam or a plurality of longitudinal chassis beams. The chamber or chambers of the central tunnel structure can additionally be configured by the upper floor pan and/or the lower floor pan, or at least be delimited by the upper floor pan or the lower floor pan, respectively.

According to one preferred refinement, a central tunnel energy storage installation space which extends in the vehicle longitudinal direction can be configured in the central tunnel structure.

As a result, the central tunnel structure can also be utilized for receiving an energy storage unit by way of which a range of the vehicle can be increased.

A fuel pressure vessel can be disposed in the central tunnel energy storage installation space of the fuel cell drive vehicle, for example.

The fuel pressure vessel in the central tunnel structure is particularly reliably protected against collisions. As a result, the fuel pressure vessel which may be a circular-cylindrical vessel, can furthermore have a larger diameter than if the fuel pressure vessel would be disposed between the upper floor pan and the lower floor pan, this increasing the storage volume of the fuel pressure vessel.

According to one preferred refinement, at least one fuel tank or else a plurality of fuel tanks can furthermore be disposed in the energy storage installation space of the hybrid drive vehicle.

As a result, the installation space present in the floor pan assembly can be optimally utilized because less space is required for the drive battery assembly than in a battery drive vehicle.

One fuel tank or a plurality of fuel tanks can furthermore be disposed in the energy storage installation space of the internal combustion engine drive vehicle.

A fuel tank in the context of the invention is a fuel tank for liquid fuels such as gasoline and diesel or else a gas pressure vessel for gaseous hydrocarbons.

According to one preferred refinement of the group of motor vehicles, the upper floor pan is configured so as to be integral to the body. The lower floor pan can likewise be configured so as to be integral to the body.

The term "integral to the body" means that the lower floor pan and/or the upper for pan are/is a component part/component parts of the body-in-white. Component parts of the body-in-white are connected to one another in a substantially non-releasable manner, for example by welding or adhesive bonding. Manufacturing is simplified as a result, and assembly parts are correspondingly avoided. A disposal integral to the body is also advantageous from the point of view of a stiffness of the floor pan assembly and the crashworthiness of the latter.

According to one preferred refinement of the group of motor vehicles, the lower floor pan is releasably fastened. The upper floor pan can likewise be releasably fastened.

This facilitates access to the interior of the floor pan assembly during assembly (manufacturing), servicing and repair of motor vehicle.

The upper/lower floor pan can furthermore have an opening in the region of the central tunnel structure. The opening can be closable in a fluid-tight manner, for example by a cover. The opening can extend across an entire length of the floor pan assembly.

The opening facilitates access to an interior of the central tunnel structure during assembly, servicing and repair.

According to one preferred refinement of the group of motor vehicles, the left rocker rail structure and the right rocker rail structure can be embodied so as to be substantially identical, in particular identical, for all vehicle types of the group of motor vehicles.

As a result, manufacturing costs are reduced by identical parts.

According to one further preferred refinement of the group of motor vehicles, the floor pan assembly between the left rocker rail structure and the central tunnel structure as well as between the right rocker rail structure and the central tunnel structure has crossbeam structures.

As a result, collision loads can be transmitted in the vehicle transverse direction and the energy storage installation space is sufficiently protected in relation to deformation.

The floor pan assembly is advantageously configured for absorbing and transmitting collision loads in the vehicle transverse direction and/or the vehicle longitudinal direction. For example, the rocker rail structure, the lower floor pan, the upper floor pan and the central tunnel structure are constructed in such a manner that these structures and floor pans can transmit collision loads.

The rocker rail structure can be configured for absorbing collision energy by deformation.

All mentioned vehicle lines which run between a front region and a rear region of the vehicle, as well as all internal lines of the drive battery assembly, can be accommodated in a central and space-saving manner in the central tunnel structure. This is particularly advantageous from the point of view of manufacturing, repairing and servicing. Furthermore, the corresponding lines are well protected in the event of a lateral collision of the motor vehicle because these lines are spaced apart from the rocker rail structures. Moreover, the lines thus disposed also do not compromise a vehicle interior (passenger cabin) above the floor pan assembly, that is to say above the upper floor pan.

Drive battery lines are, for example, electrical lines (in particular high-voltage lines), data lines (signal or control lines, respectively) and cooling lines for cooling and/or heating (temperature controlling) the battery cells. Vehicle operating equipment lines are, for example, brake lines (hydraulic or pneumatic), fuel lines, coolant lines, compressed air lines, windshield washer water lines. Vehicle electrical/electrical lines are all electronic or electrical lines, respectively, which in the motor vehicle can be combined in a so-called wiring harness and run from a front region of the motor vehicle to a rear region of the motor vehicle.

The drive battery or drive battery assembly, respectively, can also be referred to as a traction battery or a high-voltage accumulator (in contrast to a pure starter battery). The drive battery assembly is disposed in the floor pan assembly of the body of the motor vehicle and is thus integrated in the body. The drive battery assembly is thus not a separate, for example fluid-tight, unit which is accommodated in a housing and in this instance is able to be assembled as a separate unit on the body. The battery assembly is accommodated in a fluid-tight manner in the floor pan assembly.

As a result, any exchange of fluid between the drive battery assembly and the vehicle interior or a motor vehicle environment, respectively, is precluded.

Refinements of the invention that are set forth above can be combined with one another in an arbitrary manner to the extent that this is possible and expedient.

DETAILED DESCRIPTION OF THE DRAWINGS

Figure 1:
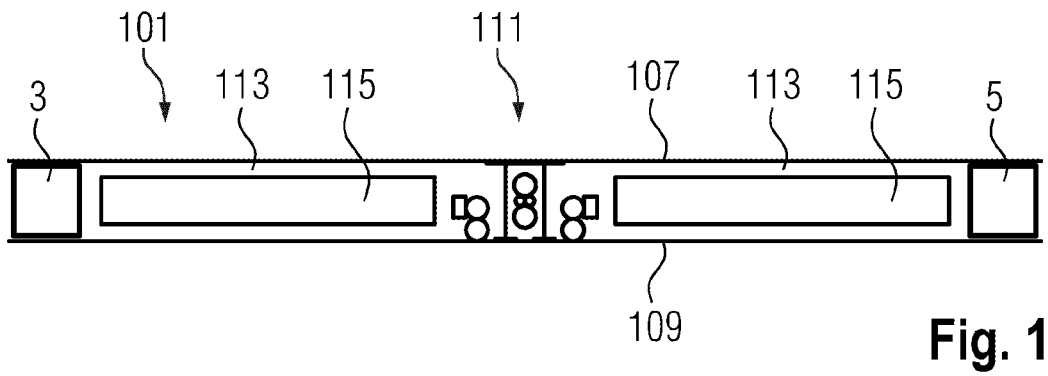
FIG. 1 shows a schematic sectional view of a floor pan assembly of a battery drive vehicle of a group of motor vehicles according to one exemplary embodiment of the present invention.

A detailed description of an exemplary embodiment of the present invention with reference to FIGS. 1 to 5 follows hereunder.

A group of motor vehicles according to the exemplary embodiment comprises the vehicle types: battery drive vehicle (100, 100'), hybrid drive vehicle (200), fuel cell drive vehicle (300) and internal combustion engine drive vehicle (400). The vehicle types of the group of motor vehicles have floor pan assemblies 101, 101', 201, 301, 401 which in some parts are of identical embodiment and in other parts are of different embodiments. All floor pan assemblies 101, 101', 201, 301, 401 have a left rocker rail 3 and a right rocker rail 5 which are embodied so as to be substantially identical for all vehicle types. Furthermore, all floor pan assemblies 101, 101', 201, 301, 401 have an upper floor pan 107, 107', 207, 307, 407 which is a body-in-white component and is non-releasably connected to the body, in particular to the rocker rails 3, 5 and optionally to crossbeams. The upper floor pan 107, 107', 207, 307, 407 at the same time forms a floor pan for a vehicle interior, that is to say a passenger cabin. Furthermore, all floor pan assemblies 101, 101', 201, 301, 401 have a lower floor pan 109, 109', 209, 309, 409 which is an assembly part and is releasably connected to the body, in particular to the rocker rails 3, 5 and optionally to crossbeams. The lower floor pan 109, 109', 209, 309, 409 is connected in a fluid-tight manner to the body. The lower floor pan 109, 109', 209, 309, 409 can be removed in particular for the purpose of servicing and repairing. As a result, assembly parts can furthermore be assembled in the floor pan assembly 101, 101', 201, 301, 401 during the manufacturing of the motor vehicle.

All floor pan assemblies 101, 101', 201, 301, 401 furthermore have a central tunnel structure 111, 111', 211, 311, 411. Vehicle electrical/electrical lines which are usually also referred to as a cable harness run in the central tunnel structure 111, 111', 211, 311, 411 of all vehicle types. Furthermore, vehicle operating equipment lines such as hydraulic or pneumatic brake lines, windshield washer fluid lines, coolant lines, etc. can run in the central tunnel structure 111, 111', 211, 311, 411 of all vehicle types. Interior ventilation outlet and interior ventilation inlet lines, for example of an air conditioning system, can likewise run in the central tunnel structure 111, 111', 211, 311, 411 of all vehicle types. The central tunnel structure 111, 111', 211, 311, 411 of the vehicle types extends substantially across an entire length of the floor pan assembly 101, 101', 201, 301, 401 and has a plurality of chambers which extend in the longitudinal direction. The central tunnel structure 111, 111', 211, 311, 411 can be configured by one longitudinal chassis beam or a plurality of longitudinal chassis beams. Crossbeams which are not shown in the figures and are conceived for transmitting or supporting, respectively, collision loads in the event of a collision of the respective motor vehicle extend between the left rocker rail 3 or the right rocker rail 5, respectively, and the central tunnel structure 111, 111', 211, 311, 411.

All floor pan assemblies 101, 101', 201, 301, 401 furthermore have one left and one right closed additional installation space or energy storage installation space 113, 113', 213, 313, 413, respectively, which are delimited by the central tunnel structure 111, 111', 211, 311, 411, the left rocker rail 3 or the right rocker rail 5, respectively, the upper floor pan 107, 107', 207, 307, 407 and the lower floor pan 109, 109', 209, 309, 409. The energy storage installation spaces 113, 113', 213, 313, 413 are embodied so as to be fluid-tight. The energy storage installation space 113, 113', 213, 313, 413 is thus protected in relation to environmental influences, and substances from the energy storage installation space 113, 113', 213, 313, 413 can likewise not make their way into the environment or into the vehicle interior.

The floor pan assemblies 101, 101', 201, 301, 401 of all vehicle types are configured in such a manner that the rocker rails 3 and 5 can absorb collision energy by deformation, in particular in the event of a lateral collision, the structure between the rocker rails 3, 5 including the upper floor pan 107, 107', 207, 307, 407, the lower floor pan 109, 109', 209, 309, 409, the crossbeams and the central tunnel structure 111, 111', 211, 311, 411 being configured so as to be sufficiently stiff in order for collision loads to be transmitted.

The floor pan assembly 101 of the battery drive vehicle 100 is shown in FIG. 1. The battery drive vehicle 100 has a purely electrical drive having only one externally chargeable drive battery as the energy source, and at least one electric motor for driving the vehicle. The battery drive vehicle 100 can also be referred to as a BEV vehicle (BEV being an abbreviation of battery electric vehicle). The battery drive vehicle 100 does not have any further drive apart from the electric drive.

A battery assembly 115 is accommodated in the energy storage spaces 113 of the battery drive vehicle 100. The battery drive vehicle 100 thus has a drive battery which is integrated in the body and thus does not have any drive battery which as a separate unit is able to be assembled in a separate housing on the vehicle body. The battery assembly 115 has a plurality of battery modules in which a multiplicity of battery cells are connected by a circuit, a power control unit and a cooling unit for temperature-controlling the battery modules.

The central tunnel structure 111 of the battery drive vehicle 100 has a longitudinal chassis beam which configures a chamber for receiving operating equipment lines and optionally a cable harness, that is to say vehicle electrical/electrical lines, which extends in the vehicle longitudinal direction. Battery lines of the battery assembly 115 are furthermore accommodated in lateral regions of the central tunnel structure 111 to the left and the right of the longitudinal chassis beam. The battery lines comprise high-voltage lines for the drive, or for charging, respectively, low-voltage lines for controlling the battery assembly 115, and cooling lines having a coolant for temperature-controlling the battery modules.

Figure 2:
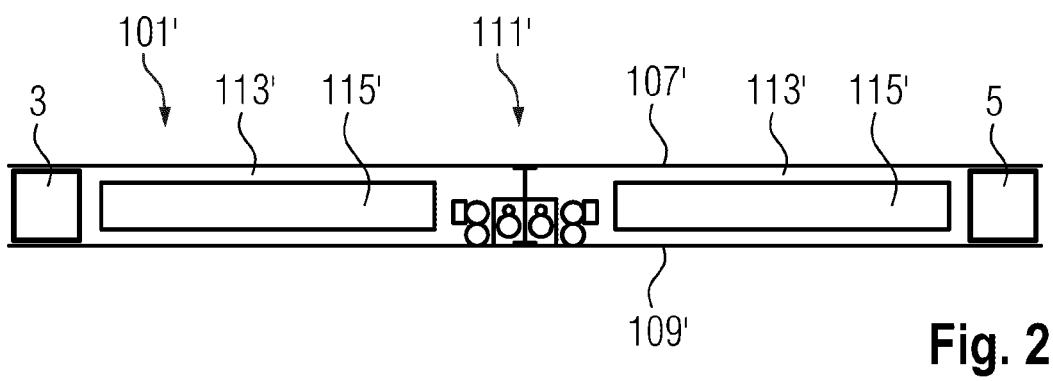
FIG. 2 shows a schematic sectional view of a floor pan assembly of an alternative battery drive vehicle of a group of motor vehicles according to the exemplary embodiment of the present invention.

The floor pan assembly 101' of a battery drive vehicle 100' is shown in FIG. 2 as a variant of the floor pan assembly 101 of the battery drive vehicle 100. Only the difference between the floor pan assembly 101' and the floor pan assembly 101 is described hereunder. A central tunnel structure 111' here is configured in such a manner that the central tunnel structure 111' has one chamber or a plurality of chambers for receiving lines such as operating equipment lines, a cable harness, battery lines, etc., which extends/extend in vehicle longitudinal directions, only in a lower region. Extending in an upper half of the central tunnel structure is a crossbeam structure for absorbing and transmitting collision loads in the vehicle transverse direction such that no continuous routing of lines in the vehicle longitudinal direction is possible here.

Figure 3:
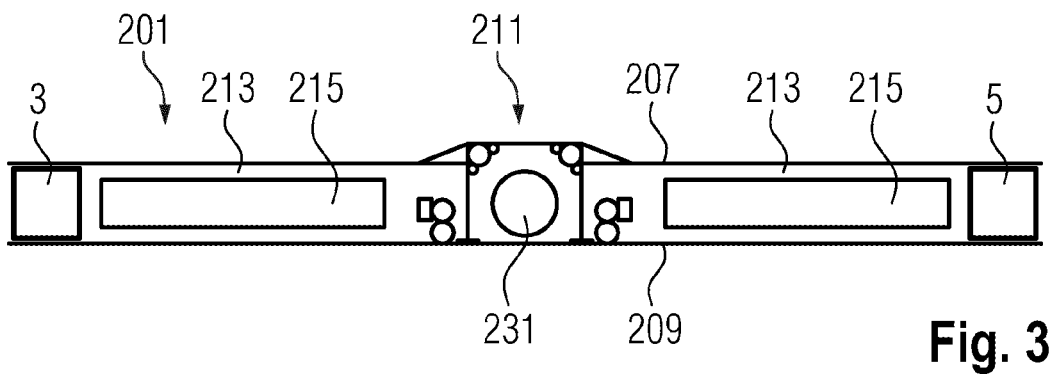
FIG. 3 shows a schematic sectional view of a floor pan assembly of a hybrid drive vehicle of a group of motor vehicles according to the exemplary embodiment of the present invention.

The floor pan assembly 201 of a hybrid drive vehicle 200 is shown in FIG. 3. The hybrid drive vehicle 200 has an electric drive having only one externally chargeable drive battery as the energy source and at least one electric motor for driving the vehicle. The hybrid drive vehicle 200 furthermore has an internal combustion engine for driving the vehicle and a corresponding fuel tank as the energy storage unit.

Only the difference between the floor pan assembly 101 and the floor pan assembly 201 is described hereunder. A chamber which is configured by one longitudinal chassis beam or a plurality of longitudinal chassis beams and in the longitudinal direction extends across an entire length of the floor pan assembly 201 is provided in the central tunnel structure 211, an exhaust system 231 of the internal combustion engine being disposed in this chamber. Additionally provided in the central tunnel structure 211, in the same chamber or in a separate chamber which extends across an entire length of the floor pan assembly 201, are operating equipment lines as well as a cable harness. Battery lines furthermore preferably run in a lateral region of the central tunnel structure 211. The longitudinal chassis beams of the central tunnel structure 211 are conceived in such a manner that these longitudinal chassis beams can also transmit transverse loads, for example in the event of a lateral collision, by way of the crossbeams of the floor pan assembly 301.

As opposed to the central tunnel structures 111 and 111', the central tunnel structure 211 is configured so as to be somewhat larger in order to provide sufficient installation space for the exhaust system 231. The central tunnel structure 211 is in particular wider and also higher.

The upper floor pan 207 can largely be embodied so as to be identical to the upper floor pan 107 or 107' but differs from the latter two in the central region. The upper floor pan 207 is in particular not embodied so as to be completely flat but has an elevation in the central region.

A battery assembly 215 is accommodated in the energy storage spaces 213 of the hybrid drive vehicle 200. The hybrid drive vehicle 200 thus also has a drive battery which is integrated in the body. A storage capacity of the battery assembly 215 is less than the storage capacity of the battery assembly 115 or 115', respectively.

One fuel tank or a plurality of fuel tanks is/are furthermore accommodated in the energy storage spaces 213 of the hybrid drive vehicle 200. The energy storage spaces 213 by virtue of the larger width of the central tunnel structure 211 are comparatively smaller in the vehicle transverse direction.

Figure 4:
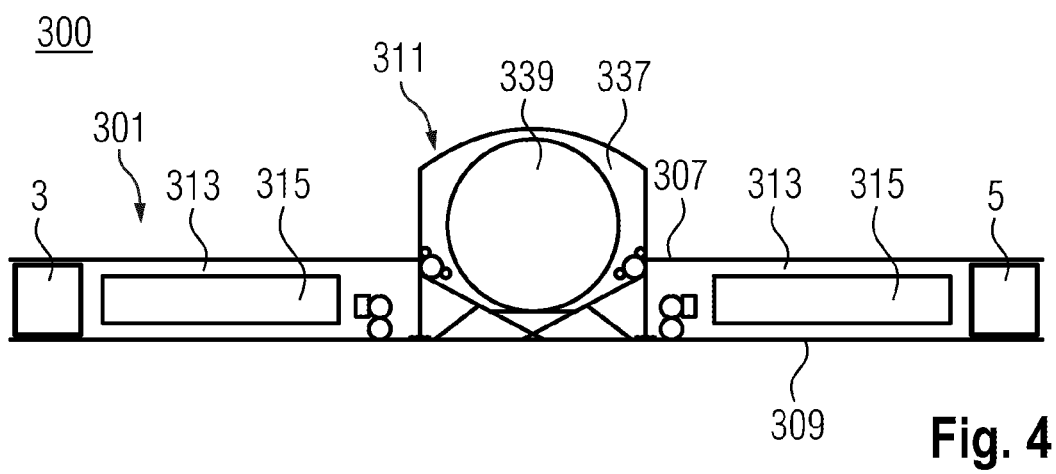
FIG. 4 shows a schematic sectional view of a floor pan assembly of a fuel cell drive vehicle of a group of motor vehicles according to the exemplary embodiment of the present invention.

The floor pan assembly 301 of a fuel cell drive vehicle 300 is shown in FIG. 4. The fuel cell drive vehicle 300 has an electric drive having a drive battery, which is normally not externally chargeable, as a temporary storage unit of electrical energy, and at least one electric motor for driving the vehicle. The fuel cell drive vehicle 300 furthermore has a fuel cell for generating electrical energy and a pressure vessel 339 for storing hydrogen under pressure for operating the fuel cell. A fuel cell drive vehicle of this type is also referred to as an FCEV (fuel cell electric vehicle).

A chamber 337 (that is to say an energy storage installation space), in which the pressure vessel 339 of the fuel cell drive vehicle 300 is accommodated and which is configured by one longitudinal chassis beam or a plurality of longitudinal chassis beams and in the longitudinal direction extends across an entire length of the floor pan assembly 301, is provided in the central tunnel structure 311. The central tunnel structure 311 by virtue of a diameter of the pressure vessel 339 protrudes significantly beyond the plane of an upper floor pan 307 of the floor pan assembly 301. The pressure vessel 339 is installed in the vehicle longitudinal direction. Operating equipment lines as well as a cable harness are additionally provided in the central tunnel structure 311 so as to be in the same chamber or a separate chamber which extends across an entire length of the floor pan assembly 301. Battery lines furthermore preferably run in a lateral region of the central tunnel structure 311. The longitudinal chassis beams of the central tunnel structure 311 are conceived in such a manner that these longitudinal chassis beams can also transmit transverse forces by way of crossbeams of the floor pan assembly 301, for example in the event of a lateral collision.

A fuel cell drive vehicle, which is not shown in the figures, in an alternative embodiment has one pressure vessel or a plurality of pressure vessels which can be accommodated in the energy storage installation spaces 313.

Figure 5:
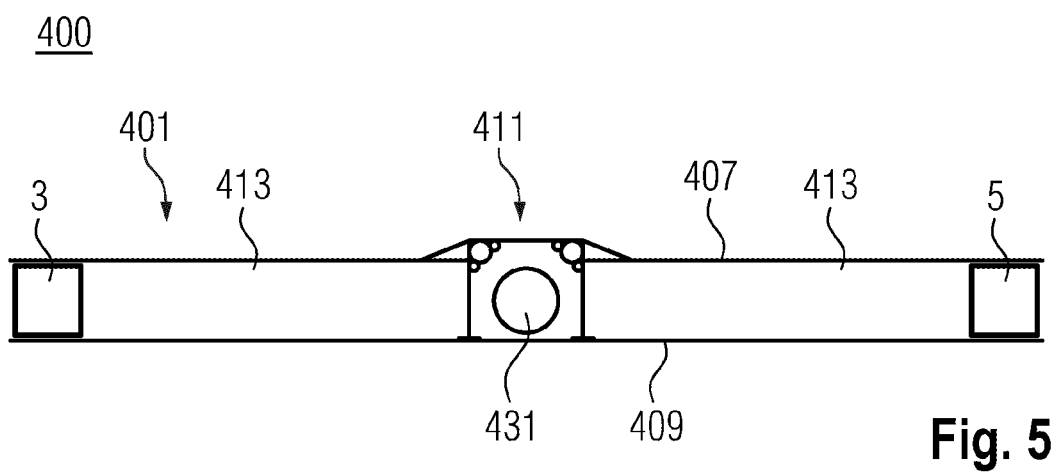
FIG. 5 shows a schematic sectional view of a floor pan assembly of an internal combustion engine drive vehicle of a group of motor vehicles according to the exemplary embodiment of the present invention.

A further vehicle of the exemplary embodiment, shown in FIG. 5, is an internal combustion engine drive vehicle 400. The internal combustion engine drive vehicle 400 can also be referred to as an ICE vehicle (ICE being an abbreviation of internal combustion engine). The internal combustion engine drive vehicle 400 has only one internal combustion engine for driving the vehicle, and at least one fuel tank. The internal combustion engine drive vehicle 400 does not have any electrical drive and accordingly also no battery as an energy source for driving the vehicle, that is to say no drive battery. Of course, the internal combustion engine drive vehicle 400 can have a starter battery which however has a significantly smaller size than a drive battery.

The floor pan assembly 401 of the internal combustion engine drive vehicle 400 can be constructed in a manner similar to the floor pan assembly 201 of the hybrid drive vehicle 200, with the difference that no battery and no battery lines are provided.

By virtue of the absent battery, a larger fuel tank, or larger fuel tanks, respectively, or one additional fuel tank or a plurality of additional fuel tanks, respectively, can correspondingly be provided in an additional installation space or energy storage installation space 413 of the internal combustion engine drive vehicle 400.

Operating equipment lines, a cable harness as well as an exhaust system 413 are accommodated in a central tunnel structure 411 of the internal combustion engine drive vehicle 400.

In all figures, vehicle lines in the central tunnel structure are illustrated in an exemplary manner as circular disks which are however not provided with reference signs and are not specified in more detail in terms of the type of these vehicle lines. A multiplicity of possibilities for disposing these lines exist. It is a common feature of the vehicle types that these lines in the central tunnel structure run in the vehicle longitudinal direction to the extent that this is expedient and possible.

Overall, the floor pan assemblies of all vehicle types described are of a fundamentally very similar construction and differ from one another in terms of a central tunnel structure and optionally in terms of a size of the additional installation space or energy storage installation space, respectively, in which the battery and/or the fuel tank or the pressure vessel, respectively, can be accommodated, the size being adapted to the central tunnel structure. From the point of view of construction and from the point of view of manufacturing, it is thus possible for a vehicle model range with different drive concepts to be implemented in a simple manner. As a result, a number of identical parts shared by the described vehicle types is advantageously very large. Any change in the market in terms of the demand for drive concepts can thus be responded to in a rapid and cost-effective manner.

What is claimed is:

1. A vehicle comprising:
    a floor pan assembly comprising:
        a left rocker rail,
        a right rocker rail,
        an upper floor pan,
        a lower floor pan extending from the left rocker rail to the right rocker rail,
        a central tunnel, and
        an energy storage installation space disposed between the upper floor pan and the lower floor pan and both between the left rocker rail and the central tunnel and between the right rocker rail and the central tunnel,
    wherein the central tunnel includes at least one of drive battery lines, vehicle operating equipment lines, electrical lines, and/or interior ventilation lines disposed in the central tunnel,
    wherein the vehicle is a battery drive vehicle, a hybrid drive vehicle, a fuel cell drive vehicle, or an internal combustion engine drive vehicle, and
    wherein the floor pan assembly comprises:
        a drive battery assembly disposed in the energy storage installation space when the vehicle is the battery drive vehicle, the hybrid drive vehicle, or the fuel cell drive vehicle; and
        a fuel tank disposed in the energy storage installation space when the vehicle is the internal combustion engine drive vehicle.

2. The vehicle according to claim 1, wherein the central tunnel has a construction based on a vehicle type of the vehicle.

3. The vehicle according to claim 1, wherein the central tunnel comprises:
    one or more chambers, wherein
        in a longitudinal direction of the floor pan assembly, the one or more chambers extend across an entire length of the floor pan assembly and are disposed below one another and/or next to one another.

4. The vehicle according to claim 3, wherein
    the one or more chambers of the central tunnel are configured by one or more longitudinal chassis beams, and/or
    the one or more chambers of the central tunnel are configured by the upper floor pan and/or the lower floor pan.

5. The vehicle according to claim 1, wherein the floor pan assembly further comprises:
    a central tunnel energy storage installation space disposed in the central tunnel and which extends in the vehicle longitudinal direction.

6. The vehicle according to claim 5, wherein
    the vehicle is the fuel cell drive vehicle; and
    the fuel cell drive vehicle further comprises:
        a fuel pressure vessel disposed in the central tunnel energy storage installation space.

7. The vehicle according to claim 1, wherein
    the vehicle is the hybrid drive vehicle; and
    the hybrid drive vehicle further comprises:
        a fuel tank disposed in the energy storage installation space.

8. The vehicle according to claim 1, wherein
the upper floor pan and/or the lower floor pan are configured to be integral to a body of the vehicle.

9. The vehicle according to claim 1, wherein
the lower floor pan and/or the upper floor pan are releasably fastened.

10. The vehicle according to claim 1, wherein
the upper floor pan and/or the lower floor pan in the central tunnel have a closable opening configured across an entire length of the floor pan assembly.

11. The vehicle according to claim 1, wherein the floor pan assembly further comprises:
one or more crossbeams disposed between the left rocker rail and the central tunnel and between the right rocker rail and the central tunnel.

12. The vehicle according to claim 1, wherein
the floor pan assembly is configured for absorbing and transmitting collision loads in a vehicle transverse direction and/or vehicle longitudinal direction, and
the right and left rocker rails, the lower floor pan, the upper floor pan, and the central tunnel are configured to transmit collision loads.

13. The vehicle according to claim 1, wherein
the right and left rocker rails is configured to absorb collision energy by deformation.

14. A vehicle comprising:
a floor pan assembly comprising:
a left rocker rail,
a right rocker rail,
an upper floor pan,
a lower floor pan spanning from the left rocker rail to the right rocker rail,
a central tunnel, and
an energy storage installation space disposed between the upper floor pan and the lower floor pan and both between the left rocker rail and the central tunnel and between the right rocker rail and the central tunnel,
wherein the central tunnel includes at least one of drive battery lines, vehicle operating equipment lines, electrical lines, and/or interior ventilation lines disposed in the central tunnel,
wherein the vehicle is at least one of a battery drive vehicle, a hybrid drive vehicle, a fuel cell drive vehicle, or an internal combustion engine drive vehicle, and
wherein the floor pan assembly comprises:
a drive battery assembly disposed in the energy storage installation space when the vehicle is the battery drive vehicle, the hybrid drive vehicle, or the fuel cell drive vehicle; and
a fuel tank disposed in the energy storage installation space when the vehicle is the internal combustion engine drive vehicle.

15. A vehicle floor pan assembly comprising:
a left rocker rail;
a right rocker rail;
an upper floor pan;
a lower floor pan spanning from the left rocker rail to the right rocker rail;
a central tunnel configured to route electrical, interior ventilation, and/or vehicle operating lines; and
an energy storage installation space disposed between the upper floor pan and the lower floor pan and both between the left rocker rail and the central tunnel and between the right rocker rail and the central tunnel and configured to store a drive battery assembly in a first configuration and a fuel tank in a second configuration.

* * * * *